United States Patent Office 3,006,794
Patented Oct. 31, 1961

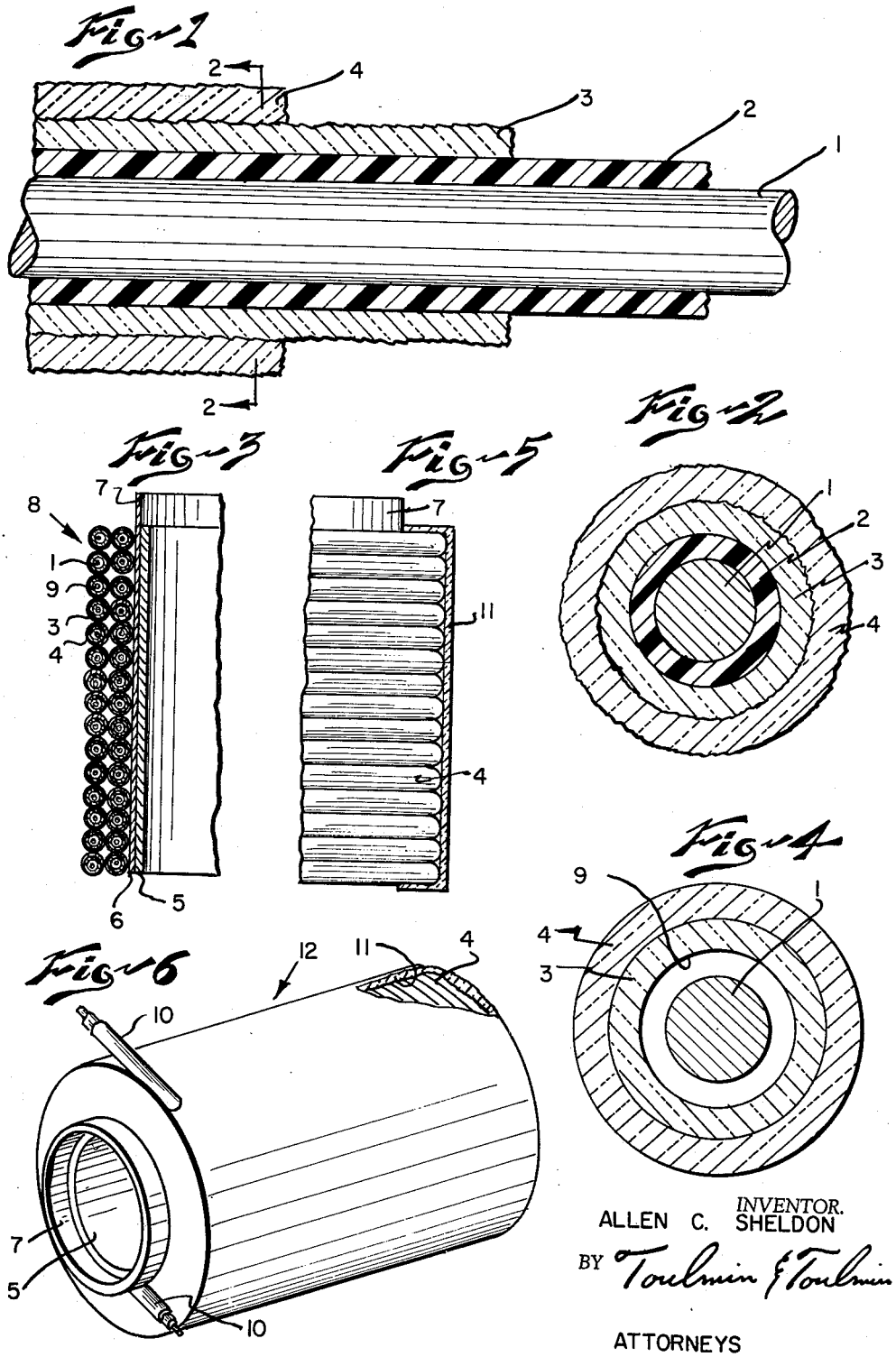

3,006,794
ARTICLES OF MANUFACTURE SUCH AS ELECTRICAL COILS AND METHOD OF PRODUCING THE SAME
Allen C. Sheldon, Fort Wayne, Ind., assignor, by mesne assignments, to Rea Magnet Wire Company, Inc., Fort Wayne, Ind., a corporation of Delaware
Filed Aug. 28, 1958, Ser. No. 757,763
3 Claims. (Cl. 156—89)

This invention relates to an improved electric coil and to a novel insulated conductor from which the coil is formed, as well as to methods of producing these articles of manufacture.

The utilization of inorganic electrical insulating constituents in electrical apparatus such as coils has normally involved an attempt to match the coefficients of expansion of the metal and insulation for the purpose of avoiding insulation cracking. It has been found, however, that if the conductor is provided within the insulation in such manner that the conductor may expand and contract freely without exerting material stress on the insulation that crack-free electrical components may be produced therefrom.

Particularly is the "insulation cracking" problem important in connection with the manufacture of electric coils. Many coil applications would be materially benefited by the provision of a crack-free coil operable at temperatures of 500° C. A primary object of this invention is to provide such a coil.

An important object of the invention is to provide an electrical conductor which in the course of electrical component manufacture is so treated as to provide within the structure of the insulated conductor an expansion cavity bounding the conductor and positioned to provide for stress-free expansion of the conductor relative to the surrounding insulation.

A particular object of the invention is the provision of a novel method for coil formation wherein the expansion cavity is created during coil manufacture.

In the practice of the invention an insulated electrical conductor is prepared by winding a high softening point, somewhat resilient inner layer of inorganic fibers, such as high silca content fibers, about a wire having a coating of a heat decomposable resin. Suitably the high softening point fibers are provided with an outer layer of lower softening point fibers, which fibers may be sintered to provide a continuous non-porous coat over the inner layer. To form a coil the insulated conductor is formed into turns in the usual manner and fired to decompose the resin. The resin decomposition products escape through the pores of the fibers, leaving a tubular-like spacing in which the inorganic insulating material rather loosely extends. Thus a cavity is provided to permit free expansion and contraction of the conductor.

The high silica content fibers are preferably not reactive chemically with the fibers of the outer layer or of the copper. Hence, when the coil is then raised to sintering temperature, the outer layer simply softens slightly, coating over the high slicia content fibers and closing the pores of the outer layer, to thereby inhibit diffusion of oxygen, for example, to the conductor. The silica fibers, however, remain resilient and form a cushion between the coating or outer layer and conductor.

The coil may be fully encapsulated if desired by providing an excess of lower melting fibers and fusing these to the coating.

In service the coil conductor may then expand and contract freely due to the provision of the expansion cavity and the lack of bond between the conductor and the insulation. Further, since the thickness of resin on the conductor wire may be controlled, the cavity dimension may be selected to provide the cavity consistent with the expansion characteristics of a given service, while maintaining the coil itself desirably small.

The invention will be more fully understood by reference to the following detailed description and accompanying drawings wherein:

FIGURE 1 is an elevational sectional view illustrating an insulated electrical conductor useful in the practice of the invention;

FIGURE 2 is a cross-sectional view taken on line 2—2 of the structure of FIGURE 1;

FIGURE 3 is a fragmentary view illustrating a coil formed from the conductor of invention and before firing;

FIGURE 4 is a sectional view similar to that of FIGURE 2, but illustrating the condition of the electrical conductor after firing of the coil;

FIGURE 5 is a fragmentary view of a coil such as that of FIGURE 3, but with encapsulating material fired thereon; and FIGURE 6 is a perspective view of a completed encapsulated coil, with a portion of the encapsulation broken away.

Referring to the drawings, the numeral 1 in FIGURE 1 designates a copper wire, such as No. 22 wire. This wire, as illustrated, is coated with a film of polyurethane. When utilizing No. 22 wire a suitable radial thickness of the resin is 1½ mils. Surrounding the resin is a winding 3 of high softening point fibers, such as silica fibers. Such fibers are available commercially under the trade name Refrasil, and are constituted of about 96 percent silica, the remainder being inorganic oxides, but suitably free of alkali oxide.

In the practice of this invention the fibers 3 are suitably in the form of continuous filaments wound closely about the resin film 2.

Illustrated at 4 in FIGURE 1 is an outer layer of lower softening point fibers such as commercial E glass. A preferable form for the purpose of this invention is E glass treated with methacrylato chromic chloride having a sintering point of 825° C.

A suitable composition for the glass is:

| Constituent: | Percentage |
|---|---|
| $SiO_2$ | 53.5 |
| $Al_2O_3$ | 14.5 |
| $B_2O_3$ | 10.0 |
| CaO | 17.5 |
| MgO | 4.5 |

On the conductor the outer sheath 4 is suitably present by weight to the extent of about 0.4 gram per foot of length of conductor; while the inner layer, when formed of the high silica content fibers mentioned above, is present to the extent of 0.3 gram per foot of length of the conductor.

The insulated conductor of FIGURE 1 is suitably formed into a coil, such as illustrated in FIGURE 3 in fragmentary view, by winding on a ceramic core 5 which is itself provided with a tape of refractory material, such as aluminum silicate fibers indicated at 6. Suitably the tape 6 has an extension 7 from one end of the coil to provide for removal of the core 5 and tape 6 from the completed coil when such is desired. The coil itself, indicated generally at 8, is then heated to about 400° C. for approximately 30 minutes, and this results in decomposition of the polyurethane and volatilization of the decomposition products, which pass through the pores of the inner layer 3 and the outer layer 4.

The volatilization of the resin leaves a void for an expansion cavity, such as is indicated generally at 9 in FIGURE 4. The fluffy fibers of the inner layer 3 will then be separated from the conductor 1 by a gap which will provide for free expansion of the conductor 1 without material stress on the fibers.

Then, without cooling the coil, the temperature is raised to about 825° C. for about 60 minutes. This temperature causes a sintering of the glass of the outer layer, resulting in a continuous film of the glass over the silica fibers 3, that is, over the inner layer.

The E glass when sintered does not flow materially into the interstices of the silica fibers, nor does it have a highly adherent mechanical bond, but it is sufficient to form a continuous non-porous coating through which the oxygen of the atmosphere will not pass when the coil is in service.

It is to be noted that as the temperature of the coil of FIGURE 3 is raised the conductor 1 tends to expand into the spacing 9. However, no material stress is exerted upon the layers 3 or 4.

After firing at the temperature of 825° C. to effect the sintering, the coil was cooled slowly to 550° C. As the temperature falls to 800° C. the glass of the outer layer becomes hard and less shrinkage of the glass occurs relative to the copper as the temperature continues to fall.

Accordingly, there is a tendency for strains to be set up in the material of the insulation. In order to relieve these strains it has been found effective to anneal the coil at 550° C. for two hours, and to thereafter slowly cool the coil to room temperature. A rate of drop of about 4° C. has been found satisfactory.

It is to be noted that in the coil of FIGURE 3 as the temperature falls the conductor 1 shrinks longitudinally, and accordingly the coil diameter decreases. This normally places a considerable strain on the insulation of the conductors of the inside layer of the coil. However, due to the resiliency of the fibrous layer 3, there is a cushioning effect provided, such that the insulation is not unduly stressed and the resultant coil is crack-free. Normally, of course, such cracks tend to occur in the outer periphery of the outer layer 4; but the combination of the cavity 9 together with the resiliency of the layer 3 is effective to inhibit cracking.

Further, due to the provision of the cavity 9 the silica fiber layer 3 is not bonded in any way to the conductor 1, and the conductor may slip readily within this inner layer, and thus substantially no stress is exerted on the layer.

As illustrated in FIGURES 5 and 6, the coil of FIGURE 3 may be provided with leads 10 and be completely encapsulated by material 11, which suitably is the same as the material of the outer layer 4 of FIGURE 1.

The coil indicated at 12, it should be noted, due to the shrinking effect of the material 11, when fired at about 850° C. tends to be compacted, which results in improvement in the coil space factor.

In the usual practice the coil 12 (FIGURE 6) is subjected to testing under high voltages to determine the presence of cracks or other imperfections in the insulation. When produced in the manner described above, with 1500 volts applied to the coil, a crack-free result is indicated.

High silica content fibers are preferred as the winding 3; mica and aluminum silicate fibers are effective although mica has less cushioning effect. The lower softening point material of the outer layer 4 need only be softenable at a temperature above that at which the coil or other article of manufacture is to operate.

The resin film 2 is heat decomposable without material carbonization and polyurethane serves the purpose well. However, other heat decomposable resins such as the methyl methacrylates or nylon may be utilized. Preferably a material which decomposes to its monomer and volatilizes, such as polyurethane, is employed.

While it is usually preferred to form the electric component and then to effect removal of the resin, such removal could be achieved in the conductor prior to component formation.

It will be understood that this invention is susceptible to modification in order to adapt it to different usages and conditions and accordingly it is desired to comprehend such modifications within this invention as may fall within the scope of the appended claims.

What is claimed is:

1. In a process of forming an electric component having inorganic electrical insulation, the step of (a) providing a length of a solid electrical conductor in the form of a wire, prior to the application of the electrical insulation, with a film of a resin which is heat decomposable without substantial carbonization, the step of (b) applying insulation material in the form of substantially alkali-free fibers over the resin in at least two layers, an inner layer of which is pervious to the passage of gases, resilient and has a higher softening point material than the outer layer, and the outer layer of which has a lower sintering point than the softening point of the conductor, but higher than the decomposition point of the resin and which outer layer is also pervious to the passage of gases, the step of (c) heating to decompose the resin and to cause the products of decomposition to pass outwardly through the fibrous resilient, pervious insulation and to thereby form an annular gap about the conductor inwardly of the insulation material, and the step of (d) thereafter raising the temperature to the sintering point of the fibers of the outer layer to provide a non-porous film on the inner layer and which film is substantially impervious to the passage of oxygen of the air.

2. In a process of forming an electric coil having inorganic electrical insulation, the step of (a) providing a solid electrical conductor in the form of a wire, prior to the application of the electrical insulation, with a film of a resin which is heat decomposable without substantial carbonization well below 500° C., the step of (b) applying over the resin inorganic insulation material in fibrous form and which retains its integrity at temperatures above 500° C. but which has an inner resilient layer of high softening point pervious to the passage of gases and an outer layer of a lower sintering point than the material of the inner layer and conductor, said outer layer also being pervious to the passage of gases, the step of (c) winding the insulated conductor into a coil form having superposed layers, the step of (d) heating the coil sufficiently to effect the decomposition of the resin and the expulsion of the volatiles through the fibrous resilient, pervious layers to thereby form an annular gap about the conductor of the winding inwardly of the insulation, the step of (e) without cooling the coil raising the temperature to the sintering point of the fibers of the outer layer to form a non-porous film of the material of the fibers and which film is impervious to the passage of oxygen of the air, and the step of (f) cooling the coil to room temperature.

3. In a process of forming an electric coil having inorganic electrical insulation, the step of (a) providing an electrical conductor in the form of a solid wire, prior to the application of the electrical insulation, with a film of a resin which is heat decomposable without substantial carbonization well below 500° C., the step of (b) applying over the resin at least two layers of inorganic insulation material in fibrous form and which is substantially alkali-free, the inner layer being resilient and pervious comprising fibers which maintain their integrity well above 825° C. and the fibers of the outer layer having a sintering point of about 825° C., the step of (c) winding the insulated conductor into a coil having superposed gas pervious layers, the step of (d) heating the coil sufficiently to effect the decomposition of the resin and the expulsion of the volatiles through the fibrous layers to thereby form an annular gap about the conductor of the winding inwardly of the insulation, the step of (e) without cooling the coil raising the temperature to the sintering point of the fibers of the outer layer to form a non-porous film of the material of the fibers and which film is substantially impervious to the passage of oxygen to the air, the step of (f) cooling the coil whereby the conductor contracts diametrically and said inner layer of fibers cushions the effect of the contraction upon the film of the outer layer, and the step of (g) annealing as the cooling continues, and the step of (h) cooling slowly to room temperature from the annealing range.

References Cited in the file of this patent

UNITED STATES PATENTS

| | | |
|---|---|---|
| 2,075,906 | Maude | Apr. 6, 1937 |
| 2,361,374 | Abbott | Oct. 31, 1944 |
| 2,390,039 | Slayter et al. | Nov. 27, 1945 |
| 2,484,214 | Ford et al. | Oct. 11, 1949 |
| 2,504,764 | Vollrath | Apr. 18, 1950 |
| 2,848,794 | Roth | Aug. 26, 1958 |
| 2,867,032 | Gerke et al. | Jan. 6, 1959 |

FOREIGN PATENTS

| | | |
|---|---|---|
| 710,711 | Great Britain | June 16, 1954 |